(12) United States Patent
Courth et al.

(10) Patent No.: US 9,441,754 B2
(45) Date of Patent: Sep. 13, 2016

(54) ELECTROMAGNETIC VALVE

(71) Applicant: Continental Teves AG & Co. oHG, Frankfurt (DE)

(72) Inventors: Christian Courth, Frankfurt (DE); Christoph Voss, Frankfurt (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 10 days.

(21) Appl. No.: 14/373,475

(22) PCT Filed: Jan. 15, 2013

(86) PCT No.: PCT/EP2013/050620
§ 371 (c)(1),
(2) Date: Jul. 21, 2014

(87) PCT Pub. No.: WO2013/110524
PCT Pub. Date: Aug. 1, 2013

(65) Prior Publication Data
US 2014/0367597 A1 Dec. 18, 2014

(30) Foreign Application Priority Data
Jan. 24, 2012 (DE) ........................ 10 2012 200 977

(51) Int. Cl.
*F16K 31/06* (2006.01)
*B60T 8/36* (2006.01)
*F16K 1/34* (2006.01)

(52) U.S. Cl.
CPC ........... *F16K 31/0655* (2013.01); *B60T 8/363* (2013.01); *F16K 1/34* (2013.01); *F16K 31/0689* (2013.01)

(58) Field of Classification Search
CPC ............. F16K 17/105; F16K 31/0689; F16K 31/0693; F16K 31/0696; F16K 31/0655; F16K 31/0686; F02M 2200/30; F02M 2200/306
USPC ....... 251/48, 52, 64, 129.07, 129.15, 129.18
See application file for complete search history.

(56) References Cited

U.S. PATENT DOCUMENTS

| 5,722,633 | A | 3/1998 | Goossens et al. |
| 6,199,587 | B1* | 3/2001 | Shlomi ................. F16K 31/082 137/625.5 |
| 6,305,355 | B1* | 10/2001 | Hoffmann ............ F02M 47/027 123/458 |

(Continued)

FOREIGN PATENT DOCUMENTS

| CN | 103052547 | 4/2013 |
| DE | 43 44 440 | 6/1995 |

(Continued)

OTHER PUBLICATIONS

International Search Report corresponding to PCT/EP2013/050620 dated Apr. 4, 2013.

(Continued)

*Primary Examiner* — Matthew W Jellett
(74) *Attorney, Agent, or Firm* — RatnerPrestia

(57) ABSTRACT

The invention relates to an electromagnetic valve, on the magnet armature of which a circumferential annular groove is arranged and in the valve housing of which an axially movable throttle disk is arranged, the throttle disk being fundamentally positioned at the height of the annular groove. The throttle disk throttles the pressure-medium flow along the magnet armature dependent on the actuation of the magnet armature in order to damp the armature impact noise.

10 Claims, 6 Drawing Sheets

(56) References Cited

U.S. PATENT DOCUMENTS

| | | |
|---|---|---|
| 7,040,594 B2 | 5/2006 | Hironaka |
| 7,543,795 B2 | 6/2009 | Hess |
| 2005/0173979 A1 | 8/2005 | Voss |
| 2007/0069165 A1 | 3/2007 | Hess et al. |
| 2013/0207016 A1 | 8/2013 | Schubitschew |
| 2013/0306891 A1 | 11/2013 | Fietz |

FOREIGN PATENT DOCUMENTS

| | | |
|---|---|---|
| DE | 195 34 227 | 4/1997 |
| DE | 102 52 231 | 11/2003 |
| DE | 10 2004 032 200 | 2/2005 |
| DE | 10 2010 003 958 | 10/2011 |
| WO | WO 2005/038322 | 3/2007 |
| WO | WO 2011/128123 | 10/2011 |
| WO | WO 2012/016741 | 2/2012 |

OTHER PUBLICATIONS

German Search Report corresponding to DE 10 2012 200 977.9, dated Aug. 30, 2012.

* cited by examiner

ELECTROMAGNETIC VALVE

CROSS REFERENCE TO RELATED APPLICATIONS

This application is the U.S. National Phase Application of PCT International Application No. PCT/EP2013/050620, filed Jan. 15, 2013, which claims priority to German Patent Application No. 10 2012 200 977.9, filed Jan. 24, 2012, the contents of such applications being incorporated by reference.

FIELD OF THE INVENTION

The invention relates to an electromagnetic valve for motor vehicle traction control systems, with a valve housing in which a valve closing member is guided moveably, and with a magnet armature for actuating the valve closing member, which magnet armature executes a lifting movement in the direction of a magnet core arranged in the valve housing as a function of the electromagnetic excitation of a valve coil mounted on the valve housing.

BACKGROUND OF THE INVENTION

An electromagnetic valve of the generic type has already become known from DE 102 52 231 A1, which is incorporated herewith, with a valve housing in which a valve closing member is guided moveably, with a magnet armature which actuates the valve closing member and which, as a function of the electromagnetic excitation of a valve coil mounted on the valve housing, executes a lifting movement in the direction of a magnet core arranged in the valve housing, and with a return spring which, in the electromagnetically nonexcited valve position, positions the magnet armature at a defined axial distance from the magnet core, the magnet armature being separated from the magnet core by an interspace.

SUMMARY OF THE INVENTION

An aspect of the invention, then, is to reduce the switching noise when the magnet armature is brought to bear against the magnet core.

This is achieved, according to the an aspect of invention, for an electromagnetic valve of the type specified, wherein a peripheral annular groove is arranged on the surface area of the magnet armature and there is arranged in the annular groove an axially moveable throttle disk which, as a function of the lift of the magnet armature, performs hydraulic throttling in the adjacent region of the annular groove.

BRIEF DESCRIPTION OF THE DRAWINGS

Further features and advantages of the invention may be gathered from the subclaims. These are explained below by means of several drawings.

In these.

DETAILED DESCRIPTION OF THE PREFERRED EMBODIMENTS

Figure 1:
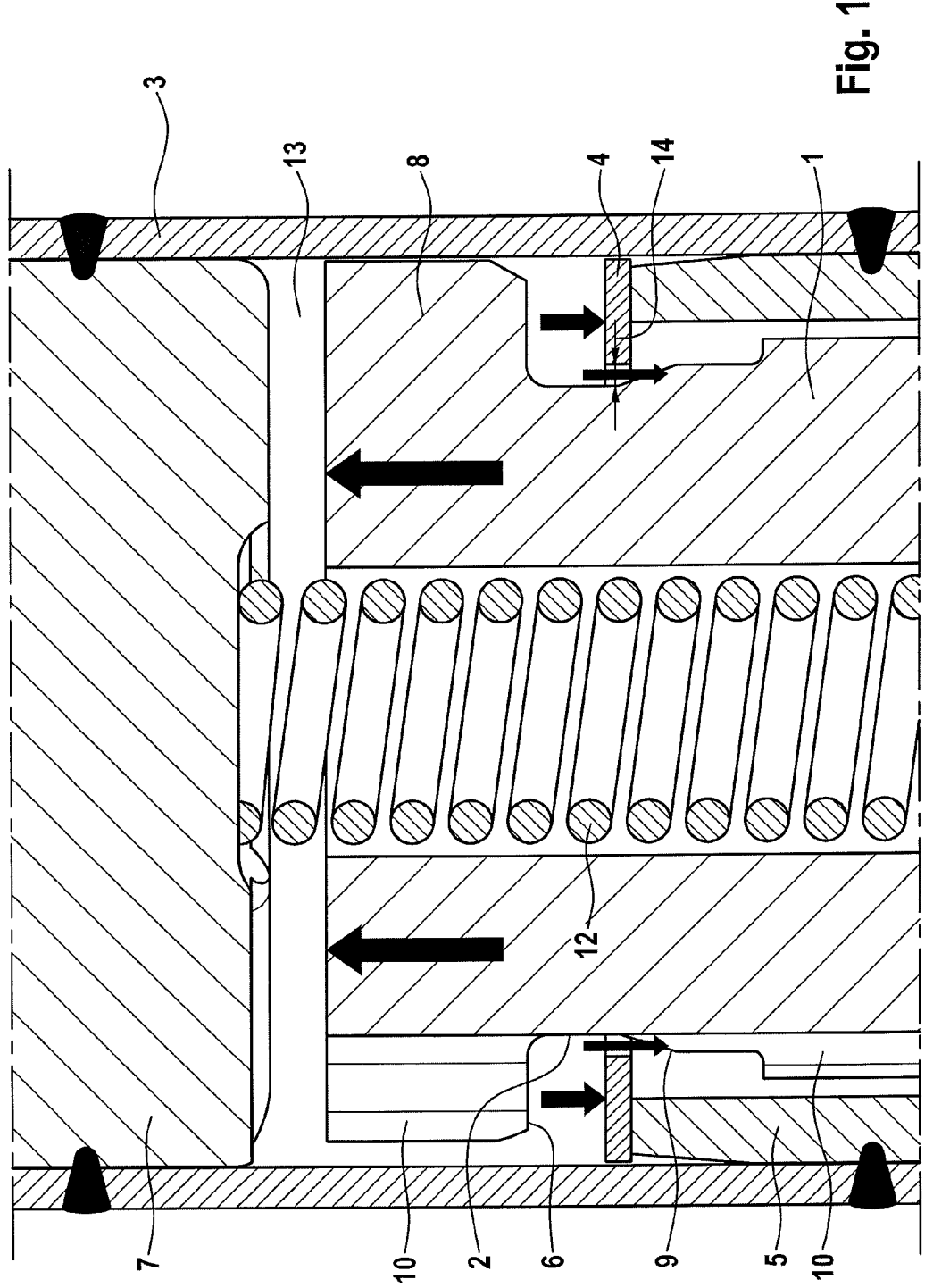
FIG. 1 shows an enlarged illustration of the details according to the invention of an electromagnetic valve in the basic valve position, composed of a return spring tension-mounted between a magnet core and a magnet armature and of an annular groove which is formed on the circumference of the magnet armature and into which a throttle disk positioned at a housing stop extends in order to produce a defined annular gap through which the flow can pass hydraulically.

FIGS. 1 to 6 show an expedient use of the invention for an electromagnetically nonexcited electromagnetic valve which is closed in its basic position and the valve housing 3 of which is designed, for example, in a cartridge form of construction. The upper part, depicted partially in FIGS. 1 to 5, of the valve housing 3 is configured as a thin-walled valve sleeve, in which a cylindrical magnet armature 1 is guided along its guide collar 8 accurately and with minimized friction. Located above the magnet armature 1 is a plug-shaped magnet core 7 which closes the valve housing 3. The magnet armature 1 accommodates inside its stepped bore a return spring 12 with a linear characteristic curve profile, which, as a helical compression spring, extends, with its turn end projecting out of the magnet armature 1, in the direction of the end face of the magnet core 7 and is supported there. Consequently, under the action of the return spring 12, the magnet armature 1, by means of a valve closing member, not illustrated in the drawings, closes the passage of a valve seat body fixed in the valve housing 3, so that, according to FIG. 1, in the electromagnetically nonexcited basic valve position, the pressure medium connection is broken.

By means of a valve coil mounted on the valve housing 3, the magnet armature 1, excited electromagnetically in a way known per se, can be moved in the direction toward the magnet core 7, so that the valve closing member can be lifted off from the valve seat body in order to make a pressure medium connection.

According to FIG. 1, in the electromagnetically nonexcited basic valve position, the magnet armature 1 remains at a defined axial distance from the magnet core 7, so that the magnet armature 1 is separated from the magnet core 7 by an interspace which, just like the entire inner space of the valve housing 3, is filled, bubble-free, with brake fluid (pressure medium) as a result of the electromagnetic valve designed as a hydraulic valve for traction-controlled motor vehicle brakes. It may be gathered from all the figures that an essential constituent of the invention is that, to avoid a disturbing magnet armature striking noise, a peripheral annular groove 2 is arranged on the surface area of the magnet armature 1, and there is arranged a throttle disk 4 which is axially moveable in the valve housing 3 and which is basically positioned, without a significant throttle action level with the annular groove 2, at a housing stop 5. To avoid a magnet armature striking noise, the throttle disk 4 causes throttling of the pressure medium to be displaced out of the interspace 13 when the magnet armature 1 is located just short of the magnet core 7, as a result of which the magnet armature 1 is braked in the direction of the magnet core 7 as a result of the hydraulic throttling.

Thus, as explained below by means of FIGS. 1 to 3, as a function of the electromagnetically initiated lift of the magnet armature 1, hydraulic action upon the throttle disk 4 is caused by the pressure medium which is displaced by means of the magnet armature 1 out of the interspace 13 along the magnet armature 1 from the top downward in the valve housing 3, as depicted, as a result of which the throttle disk 4 remains at the housing stop 5 for the throttling of the displaced pressure medium along the annular groove 2 and for the braking of the magnet armature 1 (see FIG. 3) which is to be achieved thereby.

Figure 4:
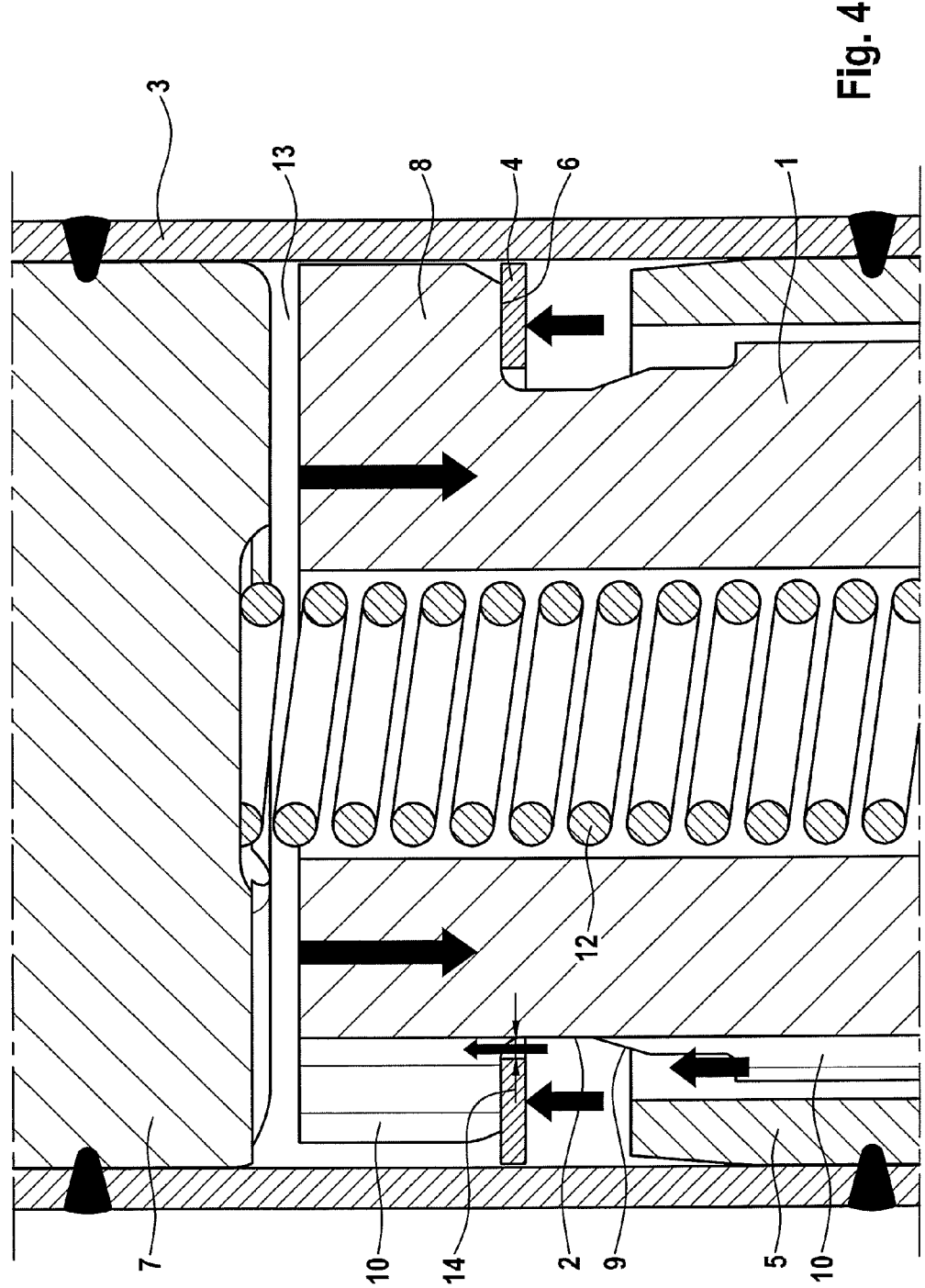
FIGS. 4 and 5 show the magnet armature in a throttle-free actuation direction opposite to FIGS. 2 and 3, for which purpose, to release a maximum annular gap, the throttle disk is lifted off from a housing stop arranged level with the oblique shoulder.
Figure 5:
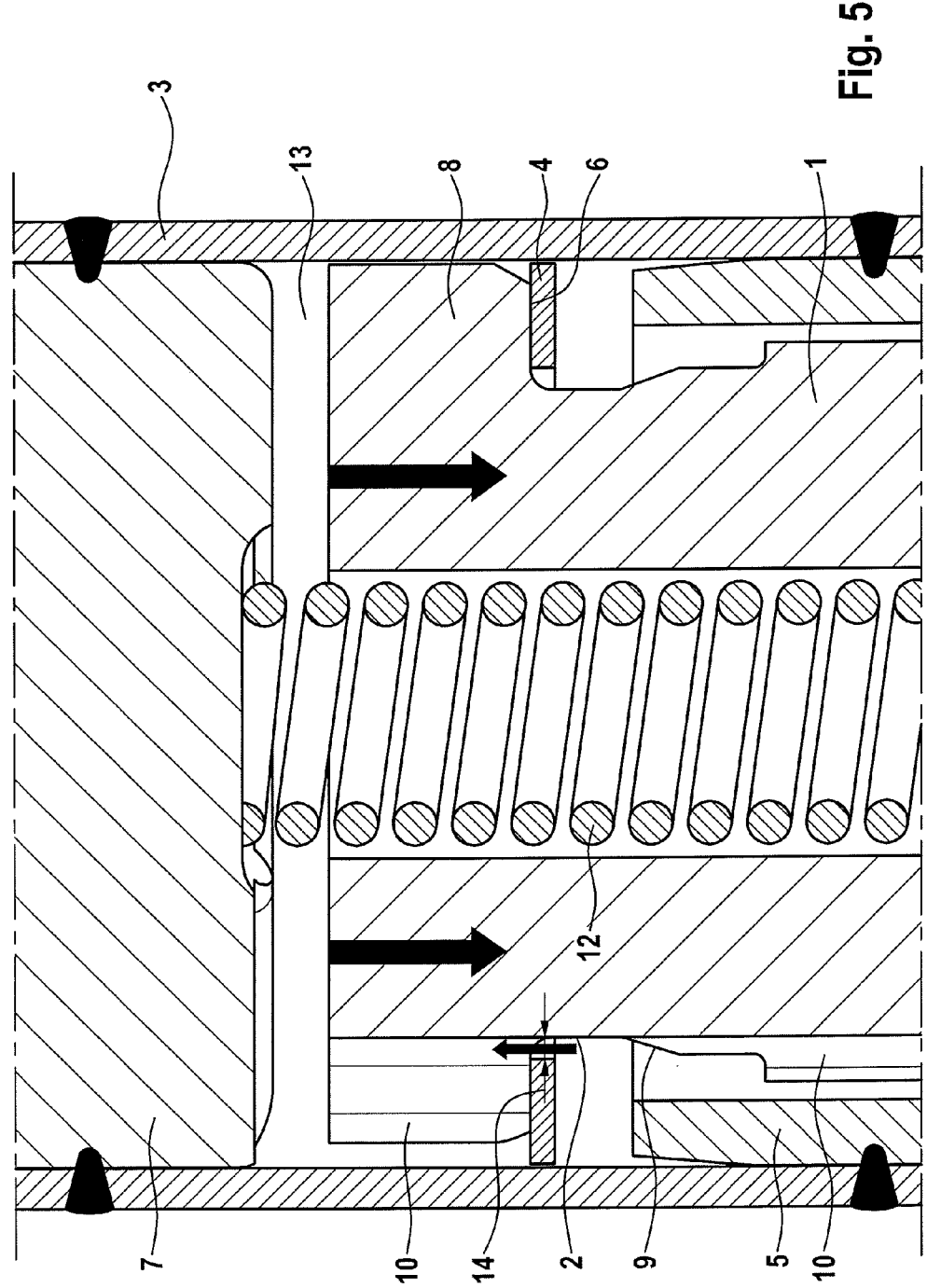

Only after the electromagnetically initiated armature lift has been interrupted does a throttle-free return of the magnet armature 1 take place according to FIGS. 4 and 5, in that the throttle disk 4, actuated hydraulically as a result of the flow reversal, is lifted off from the housing stop 5 in the direction of the stop face 6 provided on the guide collar 8, so that the magnet armature 1 is returned, without delay, into the basic position as a result of the action of the return spring 12.

Figure 2:
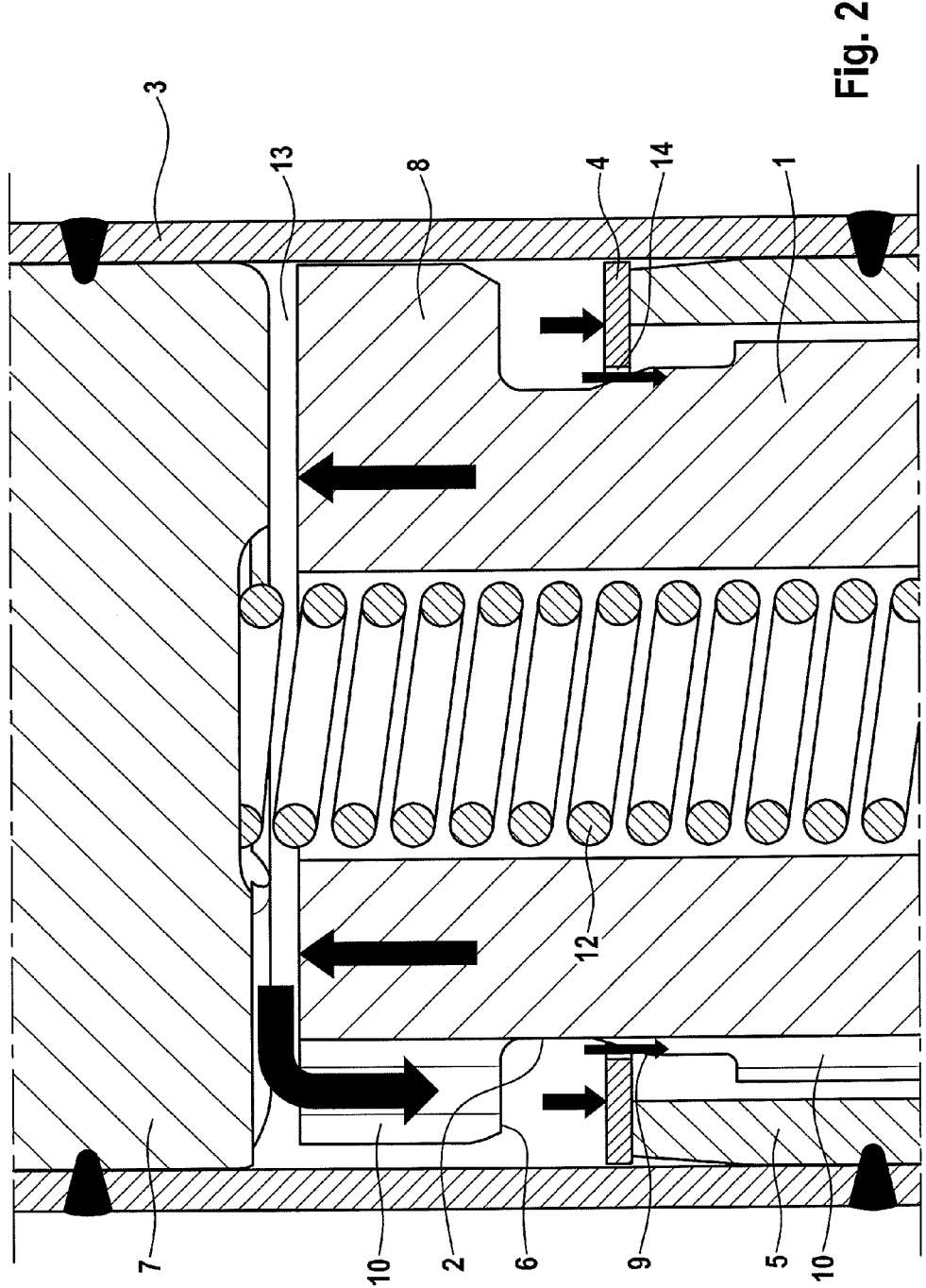
FIGS. 2 and 3 show, on the basis of FIG. 1, the magnet armature braked hydraulically in the direction of the magnet core, for which purpose, to reduce the annular gap, the throttle disk overlaps with an oblique shoulder of the magnet armature, said oblique shoulder adjoining the annular groove.
Figure 3:
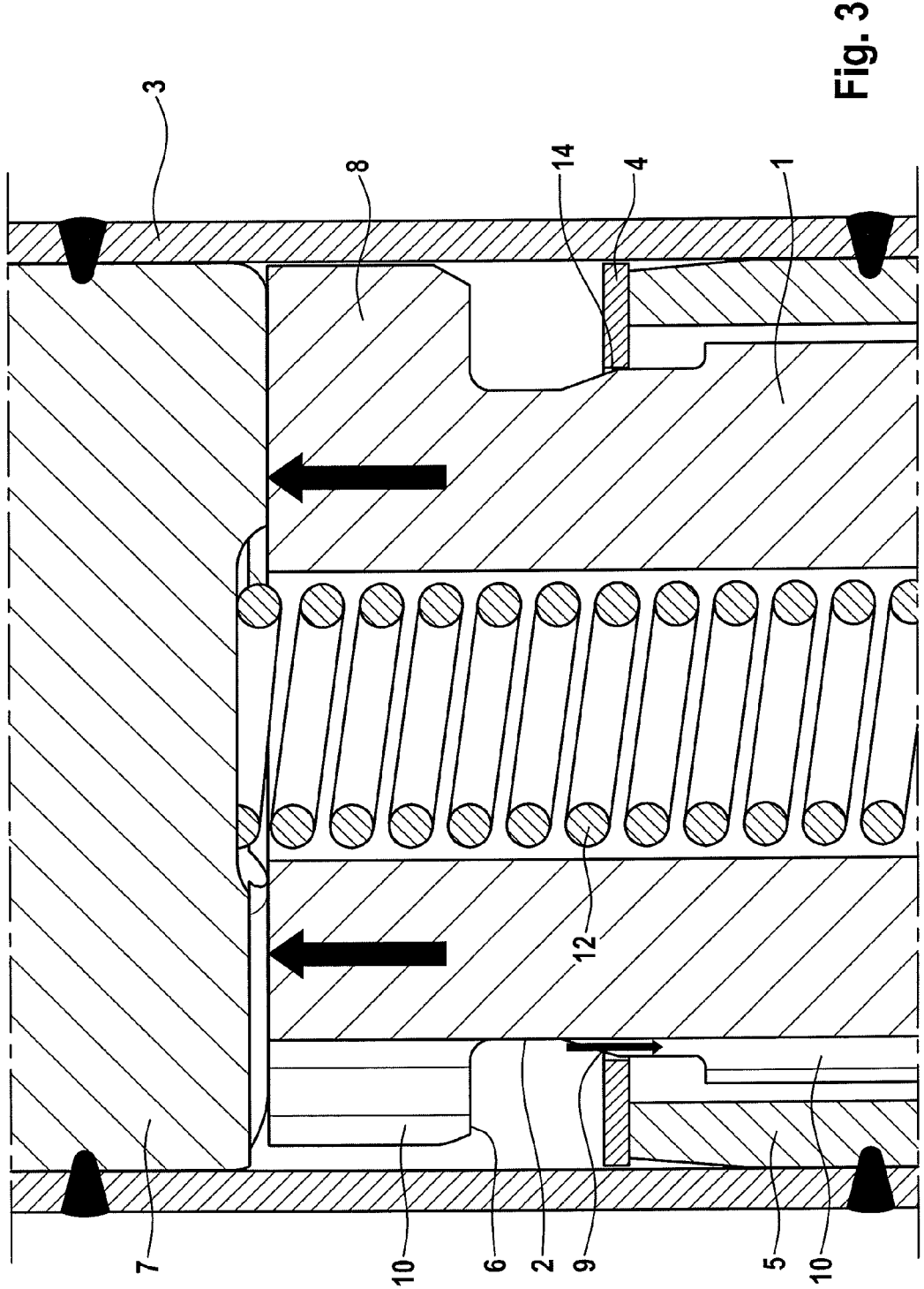

For this purpose, according to FIGS. 1 to 6, the throttle disk 4 is accommodated with play in the annular groove 2, the throttle disk 4 alternately bearing in each case with one of its two end faces either, according to FIGS. 1 to 3, against the housing stop 5 fixed in the valve housing 3 or, according to FIGS. 4 and 5, against the stop face 6 of the magnet armature 1, said stop face delimiting the annular groove 2 and being formed on the underside of the guide collar 8.

As may be gathered from FIG. 1, the magnet armature cross section in the region of the annular groove 2 is a minimum for the throttle-free axial throughflow of an annular cross section provided between the magnet armature 1 and the valve housing 3. In structural terms, the annular groove 2 is delimited in the direction of the magnet core 7 by the stop face 6 formed on the guide collar 8 of the magnet armature 1 and, opposite the stop face 6, by a conically widened oblique shoulder 9 of the magnet armature 1, as a result of which in each case the relative position of the throttle disk 4 inside the annular groove 2 determines the size of the annular gap 14 lying inbetween, in order, for the purpose of influencing the magnet armature movement, to achieve either the unthrottled flow state in the region of the stop face 6 or a throttled flow state by means of the region of the oblique shoulder 9.

According to FIG. 1, when the magnet armature 1 is excited electromagnetically, the throttle disk 4 remains at the housing stop 5, the throttle disk 4 being level with the annular groove 2 at the start of the electromagnetic excitation of the armature, so that the annular gap 14 provided for unimpeded throughflow between the annular groove 2 and the throttle disk 4 amounts, unchanged, to a maximum in the basic valve position. Consequently, first, at the start of the electromagnetically initiated lifting movement of the magnet armature 1 over the height of the annular groove 2, an unthrottled, delay-free actuation of the magnet armature 1 in the direction of the magnet core 7 takes place, until, during the electromagnetically excited actuation of the magnet armature according to FIG. 2, the throttle disk 4 is level with the continuously radially widening oblique shoulder 9, as a result of which, for the effective hydraulic braking of the magnet armature 1, the annular gap 14 provided for throughflow between the conical oblique shoulder 9 and the throttle disk 4 amounts to a minimum with an increasing lift of the armature. Consequently, the pressure medium to be displaced out of the interspace 13 in the direction of the throttle disk 4 can escape, only throttled, through the minimum annular gap 14, until finally, according to FIG. 3, the magnet armature 1 bears silently against the magnet core 7.

Only when the electromagnetic excitation of the magnet armature 1 is interrupted are the movement processes reversed, according to which the magnet armature 1 moves downward according to FIGS. 4 and 5 under the action of the return spring 12, with the result that the pressure medium displaced vertically from below in the direction of the widening interspace 13 moves the throttle disk 4 against the stop face 6. The throttle disk 4 thereby passes again into the throttle-free region of the annular groove 2 which has the maximum annular gap for unimpeded throughflow.

To reduce the flow resistance, the surface area of the magnet armature 1 is provided with at least one longitudinal groove 10 which extends from the upper guide collar 8 via the annular groove 2 and the oblique shoulder 9 to the lower end, facing the valve closing member not depicted, of the magnet armature 1, so that the vertical throughflow of the longitudinal groove 10 takes place directly, as free of deflection as possible, as a function of the size of the annular gap 14 in each case released by the throttle disk 4.

As may be gathered from the previous description and the drawings, the two end faces on the throttle disk 4 are acted upon hydraulically in each case opposite to the lifting direction of the magnet armature 1, so that the action upon the throttle disk 4 or the lifting movement of the latter always takes place opposite to the lifting movement of the magnet armature 1. Correspondingly, in FIGS. 1-3, as a result of the hydraulic action upon the upper end face of the throttle disk 4 opposite to the upward movement of the magnet armature 1, the throttle disk 4 remains in the lower position at the housing stop 5, since the pressure medium is displaced out of the interspace 13 in the direction of the housing stop 5, whereas, in FIGS. 4 and 5, after the interruption in electromagnetic excitation, with the downward movement of the magnet armature 1 initiated by the return spring 12, the lower end face of the throttle disk 4 is acted upon by the pressure medium displaced in the valve housing 3 upward in the direction of the widening interspace 13. The throttle disk 4 is thereby lifted off from the housing stop 5 and arrives at the stop face 6 of the guide collar 8, until the magnet armature 1, excited electromagnetically again, is moved in the opposite direction known from FIG. 1.

Figure 6:
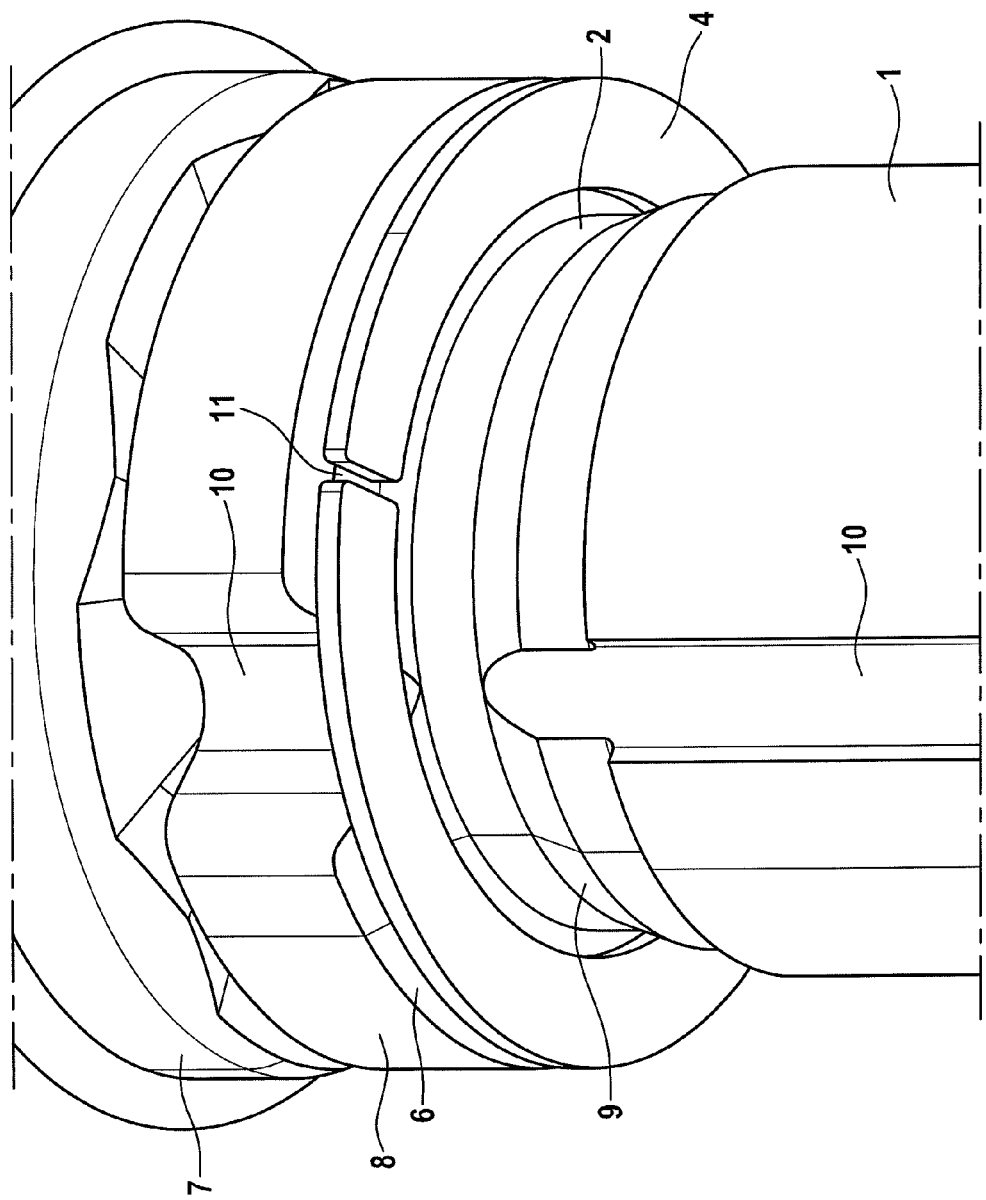
FIG. 6 shows a perspective view of the details depicted in FIGS. 1 to 5.

Finally, FIG. 6 shows a perspective illustration of the components of the electromagnetic valve which are already known from FIGS. 1-5, the particular feature being that the throttle disk 4 designed as an annular disk is expandable elastically for mounting in the annular groove 2, for which purpose the throttle disk 4 is interrupted at the circumference by means of a slit 11. The throttle disk 4 can thereby be pushed from below over the magnet armature 1 until said throttle disk, after traveling over the oblique shoulder 9, springs back elastically inside the annular groove 2, as a result of which, assuming appropriate spring properties, the slit 11 is automatically closed again.

The throttle disk 4 is composed of a nonmagnetizable material, for example of a strip of steel or of a wear-resistant plastic, so that cost-effective production by stamping, injection molding or compression molding is possible.

In summary, therefore, an electromagnetic valve is proposed, which, for damping the magnet armature striking noise, requires merely an annular groove 2 running peripherally on the surface area of the magnet armature 1 and a throttle disk 4 which is axially moveable in the valve housing 3 and which, as a function of the lift of the magnet armature 1, performs hydraulic throttling in the adjacent region of the annular groove 2.

LIST OF REFERENCE SYMBOLS

1 Magnet armature
2 Annular groove
3 Valve housing
4 Throttle disk
5 Housing stop
6 Stop face
7 Magnet core
8 Guide collar
9 Oblique shoulder
10 Longitudinal groove
11 Slit
12 Return spring
13 Interspace
14 Annular gap

The invention claimed is:

1. An electromagnetic valve, for motor vehicle traction control systems, with a valve housing in which a valve closing member is guided moveably, and with a magnet armature for actuating the valve closing member, which magnet armature executes a lifting movement in the direction of a magnet core arranged in the valve housing as a function of the electromagnetic excitation of a valve coil mounted on the valve housing, wherein a peripheral annular groove is arranged on the surface area of the magnet armature and there is arranged in the annular groove an axially moveable throttle disk which, as a function of the lift of the magnet armature, performs hydraulic throttling in the adjacent region of the annular groove,
wherein the annular groove is delimited in a direction of the magnet core by a stop face formed on an upper guide collar of the magnet armature and, opposite the stop face, by a conically widened oblique shoulder of the magnet armature, the shoulder comprising a surface extending obliquely outward from the magnet armature in a direction away from the stop face.

2. The electromagnetic valve as claimed in claim 1, wherein the throttle disk is an annular disk through which the magnet armature penetrates and which can be brought to bear alternately, in each case with one of its two end faces, either in region of a housing stop fixed in the valve housing or in a region of the stop face of the magnet armature.

3. The electromagnetic valve as claimed in claim 1, wherein the magnet armature cross section in the region of the annular groove is a minimum for the throttle-free axial throughflow of an annular cross section provided between the magnet armature and the valve housing.

4. The electromagnetic valve as claimed in claim 2, wherein the throttle disk bears against the housing stop in the electromagnetically nonexcited basic valve position and at the start of electromagnetic actuation of the magnet armature, with the result that the throttle disk is level with the annular groove, so that the annular gap provided for throttle-free throughflow between the annular groove and the throttle disk is a maximum.

5. The electromagnetic valve as claimed in claim 3, wherein during the electromagnetically excited valve position, the throttle disk is level with the oblique shoulder after the execution of a defined armature lift, so that the annular gap present for throttling throughflow between the oblique shoulder and the throttle disk is a minimum.

6. The electromagnetic valve as claimed in claim 3, wherein the surface area of the magnet armature has at least one longitudinal groove which extends from the upper guide collar via the annular groove and the oblique shoulder to the lowcra lower end, facing the valve closing member, of the magnet armature.

7. The electromagnetic valve as claimed in claim 6, wherein the throttled and the unthrottled throughflow of the longitudinal groove take place as a function of the relative position of the throttle disk with respect to the annular groove and to the oblique shoulder.

8. The electromagnetic valve as claimed in claim 2, wherein as a function of the hydraulic action upon the active faces of the two end faces of the throttle disk, the lifting movement of the throttle disk takes place opposite to the lifting direction of the magnet armature.

9. The electromagnetic valve as claimed in claim 1, wherein the throttle disk designed as an annular disk is expandable elastically, for which purpose the annular disk is interrupted at the circumference by means of a slit.

10. The electromagnetic valve as claimed in claim 9, wherein the throttle disk is produced from a nonmagnetizable material, by stamping, injection molding or compression molding.

* * * * *